Patented Apr. 26, 1949

2,468,329

UNITED STATES PATENT OFFICE 2,468,329

METHOD FOR TREATMENT OF SOILS FOR AGRICULTURAL PURPOSES

Charles Gordon Haycock, Shafter, Calif., assignor to Union Oil Company of California, Los Angeles, Calif., a corporation of California No Drawing. Application August 21, 1944, Serial No. 550,496

9 Claims. (Cl. 47—58)

This invention relates to the improvement of the soil for agriculture purposes and particularly to a process for treating the soil to improve the production of potatoes.

One of the most common diseases to which potatoes are susceptible is called common scab which is caused by Actinomyces scabies. This disease tends to cause lesions which show up as roughened corky areas which may be raised, level or depressed in form. Some progress in the treatment for prevention of scab has been made by treatment of the seed. It has also been found that in some instances the application of sulfur to scab infected soils is helpful. However, sulfur has not given uniformly good results, in many instances no benefit whatever having resulted.

It has now been discovered that if the infected soil is treated with sulfuric acid which has been employed as a catalyst in the alkylation of olefin hydrocarbons and isoparaffin hydrocarbons for the production of aviation gasoline that the treated soil is not only substantially freed of infection but also the soil is greatly improved in texture.

As an example of the invention a plot of soil was treated with alkylation spent acid having a sulfuric acid content of about 88% by weight and an organic content of about 6% by weight. About 40 to 100 pounds of this acid was applied to each square rod of soil area, by merely sprinkling it on the soil. Thereafter the treated soil was cultivated in the manner normally employed for preparing the soil for potato planting. After the planting and substantial growth of the potatoes it was found that the potatoes dug from those sections of the soil which had been acid treated were entirely free from scab, while potatoes grown in the non-treated soil were so badly coated with scab as to make the potatoes unmarketable. Furthermore, the treated soil was found to be sandy in texture, much more easily pulverized than the untreated portions, and substantially free from lumps, whereas the untreated soil had a lumpy clayey texture. Treatment between the above limits was found to be most effective. Treatment with smaller than about 40 pounds had somewhat less effect in conditioning the soil while treatments with amounts greater than about 100 pounds resulted in slight damage to the seed potato. Smaller amounts than 100 pounds had little or no deleterious effect on the development of the plant or seed. Many different types of treatment had previously been applied to the above soil for the elimination of the scab but none had been effective until the above treatment was employed. The above treatment reduced the alkalinity of the soil materially and appeared to have a very beneficial effect on plant growth.

Similar beneficial effects to those of the above example may be obtained by similar acid treatment of other soils infected with actinomyces, which affect potatoes and other tubers, with the spent acids as described below. Similarly treatment of any alkaline soil with these materials appears to have a beneficial effect on its texture.

The spent alkylation acid of this invention generally contains more than about 70% by weight of sulfuric acid together with between about 2% and 20% of organic material. This spent acid is the spent catalyst from the alkylation process described above in which olefin hydrocarbons and isoparaffin hydrocarbons, especially those containing less than about 7 carbon atoms per molecule, are reacted to form alkylate which is used in aviation gasoline. The alkylation process may be exemplified by the reaction between butenes and iso-butane to form iso-octanes. In practice the butenes are generally employed in the form of a mixture with butanes and other hydrocarbons resulting from the fractionation of cracking still gases. The isobutane is generally employed in admixture with normal butane in a fraction resulting from the fractional distillation of natural gasoline. Other olefins and other isoparaffins may be recovered from similar sources and employed in the alkylation process, or the hydrocarbons may be produced in other ways. For example, the butenes or other olefins may be prepared by dehydrogenation of butanes or the isobutane may be prepared by the isomerization of normal butane. In the reaction between the olefins and the isoparaffins to form alkylate the sulfuric acid commonly used as the catalyst has a concentration between about 90% and 100% by weight. During the course of the alkylation reaction side reactions occur in which the sulfuric acid is partially destroyed and the hydrocarbons are changed in form to produce organic material of unknown constitution. Thus the catalyst over extended periods of usage becomes "spent" that is, its content of sulfuric acid decreases and its content of organic materials increases until its effectiveness as an alkylation catalyst is so reduced as to make its further use uneconomical.

For the purposes of this invention the term "spent alkylation acid" will be used to designate acid which has been used in the alkylation process described above until its content of sulfuric acid is reduced below about 90% and its content of organic material has increased above about 2%.

Although the spent alkylation acid as described above has been found to be most effective for the purpose of this invention, other forms of sulfuric acid have also been found useful. Spent sulfuric acid recovered as sludge in the acid treatment of cracked gasoline or the acid treatment of lubricating oils, kerosene, spray oils, white oils, and the like has also been found effective. This material may contain much less sulfuric acid, such as down to about 20% by weight, and may contain much more organic material, up to as much as 50% by weight or more. Both the spent alkylation acid described above and the sludge acid just described may be classified under the generic term "spent sulfuric acid." Also included in this term are the acidic residues from treatment of these acids for recovery of the bulk of their sulfuric acid. For example, the spent alkylation acid above may be treated to remove about 75% of its sulfuric acid content, leaving a residue containing about 20% of sulfuric acid, which is to be considered a spent acid within the meaning of this invention.

The presence of the organic material in the above described spent acids may exert a definite beneficial effect in destroying disease producing organisms such as the above actinomyces and similar organisms. For this reason the spent acids are preferred. The sulfuric acid should have a concentration higher than about 20% and preferably higher than about 50% by weight and preferably should contain a minor proportion greater than about 2% of organic material. As mentioned above the constitution of the organic material is not definitely known. Some of the constituents which appear to be present however include olefin polymers, alkyl sulfates, sulfonic acids and hydrocarbons. These are all dissolved in the spent acids and tend to be rejected as a separate oily layer when the acids are diluted. For this reason when spent acids are employed it is preferred to apply them in concentrated form such as by separating or sprinkling on the soil. If desired however the sulfuric acid may also be diluted with water and applied in dilute form provided sufficient agitation is employed to prevent substantial separation of the oily layer. Other methods of application may also be employed. For example, the spent alkylation acid may be metered into the flowing irrigation water. After application of the acid the soil should be entirely cultivated and may also be thoroughly watered if desired. As described above the preferred amounts to be used vary between about 40 and 100 pounds per square rod, although amounts as low as about 5 pounds and as high as about 300 pounds or more per square rod may be used under certain conditions.

The application of sulfuric acid as described herein may be combined with the application of other fertilizers, fungicides, soil conditioners and the like such as sulfur, metal sulfates such as gypsum or iron sulfate, manure and the like.

Other modifications of this invention which would occur to one skilled in the art may be employed and these are to be included in the scope of the invention as defined in the following claims.

I claim:

1. A method for improving the soil for agricultural purposes which comprises applying thereto spent sulfuric acid containing a minor proportion greater than about 2% of organic material, in an amount between about 5 pounds and 300 pounds per sq. rod.

2. A method for improving the texture of an alkaline soil which comprises applying thereto spent sulfuric acid containing a minor proportion greater than about 2% of organic material, in an amount between about 5 pounds and 300 pounds per sq. rod.

3. A method for preventing disease of tuberous plants which comprises growing said plants in a soil which has been treated with spent sulfuric acid containing a minor proportion greater than about 2% of organic material, in an amount between about 5 pounds and 300 pounds per sq. rod.

4. A method for preventing scab on potatoes which comprises growing said potatoes in a soil which has been treated with spent alkylation acid in an amount between about 5 pounds and 300 pounds per square rod, said spent acid having been employed as a catalyst in the alkylation reaction between olefinic hydrocarbons and isoparaffinic hydrocarbons.

5. A method according to claim 4 in which the spent acid contains more than about 80% by weight of sulfuric acid and between about 2% and 20% of organic material.

6. A method for preventing scab on potatoes which comprises growing said potatoes in a soil which has been treated with spent alkylation acid in an amount between about 40 pounds and 100 pounds per sq. rod, said spent acid having been employed as a catalyst in the alkylation reaction between olefinic hydrocarbons and isoparaffinic hydrocarbons.

7. An improvement in the method of growing potatoes in an alkaline soil, which comprises applying to said soil spent sulfuric acid containing a minor proportion greater than about 2% of organic material derived from the treatment of hydrocarbons, in an amount between about 40 and 100 pounds per sq. rod and thereafter growing potatoes in said treated soil.

8. An improvement in a method of growing potatoes in an alkaline soil which comprises treating said soil with spent sulfuric acid containing a minor proportion greater than about 2% of organic material derived from the treatment of hydrocarbons, in an amount between about 40 pounds and 100 pounds per sq. rod, cultivating the soil, and subsequently growing potatoes therein.

9. A method according to claim 8 in which the soil is thoroughly watered prior to growing the potatoes therein.

CHARLES GORDON HAYCOCK.

REFERENCES CITED

The following references are of record in the file of this patent:

UNITED STATES PATENTS

| Number | Name | Date |
|---|---|---|
| 2,267,458 | Goldsby | Dec. 23, 1941 |

FOREIGN PATENTS

| Number | Country | Date |
|---|---|---|
| 365,945 | Great Britain | Jan. 28, 1932 |

OTHER REFERENCES

Chem. Abs., vol. 17, p. 3742, published 1923.
Chem. Abs., vol. 36, col. 4252, published 1942.
Biol. Abs., vol. 8, p. 2161, entry 19521, published 1934.
Biol. Abs., vol. 11, p. 1261, entry 11948, published 1937.
Miller, "Agronomic Value . . . .," published Apr. 1944 in J. Am. Soc. Agron., vol. 36, pp. 274–280.
Jacob, "Field Experiments . . . .," published Apr. 1944 in J. Am. Soc. Agron., vol. 36, pp. 281–286.
Berkner, "Die Ursachen des Kartoffelschorfes . . . ," published 1933 in Landw. Jahrb., vol. 78, pp. 295–342, particularly pp. 295, 312, 342.